(12) United States Patent
Gallo (10) Patent No.: US 8,590,440 B2
(45) Date of Patent: Nov. 26, 2013

(54) COMBINATION WALKING STICK AND FIREARM SUPPORT

(76) Inventor: Mitch Gallo, Miles City, MT (US)

( * ) Notice: Subject to any disclaimer, the term of this patent is extended or adjusted under 35 U.S.C. 154(b) by 100 days.

(21) Appl. No.: 13/414,937

(22) Filed: Mar. 8, 2012

(65) Prior Publication Data

US 2013/0232844 A1   Sep. 12, 2013

(51) Int. Cl.
*F41A 23/02* (2006.01)
(52) U.S. Cl.
USPC ................... 89/37.04; 42/94; 135/66
(58) Field of Classification Search
USPC ............ 42/94; 89/37.04; 135/66, 76
See application file for complete search history.

(56) References Cited

U.S. PATENT DOCUMENTS

| | | | |
|---|---|---|---|
| 3,576,084 A * | 4/1971 | Anderson, Jr. | 42/94 |
| 3,584,821 A | 6/1971 | Glebe | |
| 4,007,554 A * | 2/1977 | Helmstadter | 42/94 |
| 4,481,964 A | 11/1984 | Minneman | |
| D276,668 S | 12/1984 | Minneman | |
| 4,882,869 A | 11/1989 | Webster | |
| 5,410,835 A * | 5/1995 | Vetter | 42/94 |
| 5,438,786 A | 8/1995 | Hilderbrand | |
| 5,808,227 A | 9/1998 | Amos | |
| 5,819,463 A | 10/1998 | Amos | |
| 5,871,025 A * | 2/1999 | Richter | 135/65 |
| 5,974,719 A * | 11/1999 | Simonek | 42/94 |
| 6,086,027 A * | 7/2000 | Klimbacher | 248/166 |
| 7,493,719 B2 | 2/2009 | Lackey | |
| 7,565,762 B2 | 7/2009 | Lackey | |
| 2002/0178637 A1 | 12/2002 | Graham | |
| 2005/0188595 A1 | 9/2005 | Lackey | |
| 2007/0266609 A1 | 11/2007 | Wuertz | |
| 2008/0172919 A1 | 7/2008 | Lackey | |

* cited by examiner

*Primary Examiner* — Stephen M Johnson
(74) *Attorney, Agent, or Firm* — Antoinette M. Tease (57) ABSTRACT

A firearm support structure comprising a main shaft with a bottom end, a bipod connector unit, a slidable first support that is movable along the main shaft between the handle and the bipod connector unit, a rotatable second support that is situated between the slidable first support and the bottom end of the main shaft, and a walking stick handle.

3 Claims, 10 Drawing Sheets

COMBINATION WALKING STICK AND FIREARM SUPPORT

BACKGROUND OF THE INVENTION

1. Field of the Invention

The present invention relates generally to the field of firearm supports, and more specifically, to a combination walking stick and firearm support.

2. Description of the Related Art

There are a number of portable shooting supports and combination shooting support/walking sticks that are the subject of issued patents or pending patent applications, but none of these inventions includes the novel features of the present invention, most notably: (1) the ability to fully support a firearm with no human contact required, in either a barrel-up or barrel-down position; (2) the ability to incorporate the functionality of a shooting bipod without requiring the bipod to be attached directly to the firearm, thereby reducing the discomfort normally associated with having a bipod directly attached to a rifle, when the rifle is carried over the shoulder with a sling; (3) the ability to fully support a camera, spotting scope or binoculars on a widely spaced tripod support base; (4) the ability to be utilized as a three-leg shooting support, or optionally, to be used as a lightweight walking stick/shooting support with single-leg shooting support, with the bipod removed; (5) the flexibility of being employable as a single-leg shooting support when shots must to be taken quickly, or alternately, of being employable as a wide-based, three-leg shooting support when high accuracy is more important than speed; (7) the ability to fully support a fishing rod with no human contact; and (8) the ability to spread the wires of a fence in order to facilitate a person's passage through the fence.

U.S. Pat. No. 3,584,821 (Glebe, 1971) discloses a firearm shooting support that comprises a vertical shaft with a single ground-contact point and a vertically adjustable firearm shooting support surface.

U.S. Pat. No. 4,481,964 and No. D276,668 (Minneman, 1982 and 1984) disclose a combination walking stick and shooting support having a single ground-contact point and a vertically adjustable firearm shooting support.

U.S. Pat. No. 4,882,869 (Webster, 1989) discloses a combination rifle rest and animal choke stick having a single ground-contact support and comprising a spring-locking firearm rest and a camera rest.

U.S. Pat. No. 5,410,835 (Vetter, 1995) discloses a two-legged (bipod) firearm shooting support that may be folded for compact storage.

U.S. Pat. No. 5,438,786 (Hilderbrand, 1995) discloses a pistol shooting support that may double as a walking staff, and having a relatively narrow-base folding tripod ground support.

U.S. Pat. No. 5,808,227 and U.S. Pat. No. 5,819,463 (Amos, 1998) disclose a firearm rest with an elongate shaft and a Y-shaped firearm cradle, in combination with a camouflage screen that is attached to the firearm rest.

U.S. Pat. No. 7,493,719 B2 (Lackey, 2009), U.S. Patent Application Pub. No. US20050188595 (Lackey, 2005), and U.S. Patent Application Pub. No. US20080172919 (Lackey, 2008) all disclose a firearm supporting apparatus that clamps to vertical shafts of varying diameters and lengths.

U.S. Patent Application Pub. No. US20020178637 discloses a pocket gun rest that may be attached to a variety of shafts and is adjustable for height.

U.S. Patent Application Pub. No. US20070266609 (Wuertz, 2007) discloses an extendable and lockable gun rest having a single ground-contact support and slidable support members.

BRIEF SUMMARY OF THE INVENTION

The present invention is a firearm support structure comprising: a main shaft with a bottom end; a bipod connector unit; a slidable first support that is movable along the main shaft between the handle and the bipod connector unit; a rotatable second support that is situated between the slidable first support and the bottom end of the main shaft; and a walking stick handle. In a preferred embodiment, the invention further comprises one or more replaceable walking stick ground tips. Preferably, the main shaft is comprised of aluminum tubing suitable for partially supporting a person while walking.

In a preferred embodiment, the main shaft has a top end, the handle is comprised of synthetic rubber or polymer and is approximately cylindrical in shape and hollow, and the handle forms a friction fit over the top end of the main shaft. Preferably, the main shaft has a bottom end, and the walking stick ground tip is attached to the bottom end of the main shaft by a threaded rod.

In a preferred embodiment, the slidable first support comprises two curvilinear metal rods. The curvilinear metal rods are preferably covered with polymer tubing. In yet another preferred embodiment, the two curvilinear metal rods are attached to a sliding bracket that surrounds the main shaft, each of the two curvilinear metal rods has a terminal end, there is a spacing between the two curvilinear metal rods, and the spacing between the two curvilinear metal rods increases from the point at which the metal rods attach to the sliding bracket to the terminal ends of the metal rods.

In a preferred embodiment, the rotatable second support comprises a metal fork. The metal fork is preferably covered with polymer tubing.

REFERENCE NUMBERS

1 Combination walking stick/shooting support
2 Main shaft
3 Handle
4 Tip
5 First support
6 Second support
7 Bipod unit
8 Legs of bipod
9 Bipod connector unit
10 Hand-tightenable bolt
11 Nut
12 Sleeve
13 Curvilinear metal rods
14 Polymer tubing
15 Threaded rod
16 Fork
17 Nylon washer
18 Nylon-filled locknut
19 Bipod-connection hole
20 Shooter
21 Rifle
22 Spotting telescope
23 Window clamp
24 First fence wire
25 Fence
26 Second fence wire

DETAILED DESCRIPTION OF INVENTION

The present invention generally covers a foldable, portable firearm support structure that incorporates a main shaft, a slidable first support, a rotatable second support, a collapsible bipod unit, a walking-stick handle, and replaceable walking stick ground tips.

The present invention may be used in several different operational modes depending upon the specific task that is to be performed. For example, in a first operational mode, the present invention may be used as a combination walking stick/vertical shooting support by optionally folding or removing the bipod unit from the main shaft. In this mode, the forearm of a firearm may be supported from underneath by the first support, enabling the shooter to have his firearm supported for increased steadiness and accuracy while shooting from a sitting or kneeling position.

In a second operational mode, the bipod unit is extended, and the invention forms a tripod, with the three ground supports consisting of the two bipod legs and the walking stick handle, in which the second support is used to cradle the forearm or barrel of a rifle or shotgun while the shooter shoots from a sitting position.

In a third operational mode, the bipod unit is extended, and the invention forms a tripod, with the three ground supports consisting of the two bipod legs and the walking stick handle, and the first support is used to support the forearm or barrel of a rifle or shotgun while the shooter shoots from a prone position, and wherein the forearm of the firearm is cradled between the two arms of the first support.

In a fourth operational mode, the bipod unit is extended, and the invention forms a tripod, with the three ground supports consisting of the two bipod legs and the walking stick handle, and the first support along with the second support are used to fully support a firearm with no additional support required from the shooter. In this mode, the firearm is positioned with the barrel angled downward, with the forearm of the firearm cradled between the two arms of the first support and the butt portion of the firearm stock supported in the fork of the second support. The first support may be positioned as required along the main shaft of the device to fit any length of rifle or shotgun. This mode of operation is particularly useful for cleaning the firearm barrel with a cleaning rod, as the chamber of the barrel may be easily accessed by the shooter when the firearm is supported in a barrel-downward direction. In this mode of operation, the present invention may also function as a temporary storage rack for the firearm.

In a fifth operational mode, the bipod unit is extended, and the invention forms a tripod, with the three ground supports consisting of the two bipod legs and the walking stick handle, and the first support along with the second support are used to fully support a firearm with no additional support required from the shooter. In this mode, the firearm is positioned with the barrel angled upward, with the butt portion of the firearm stock cradled between the arms of the first support and the forearm portion of the firearm supported on the fork of the second support. The first support may be positioned as required along the main shaft of the device to fit any length of rifle or shotgun. In this mode of operation, the present invention functions as a temporary storage rack for the firearm, with the elevated barrel orientation being desirable for preventing the barrel from becoming plugged with snow or other ground debris.

In a sixth operational mode, the bipod unit is extended, and the invention forms a tripod, with the three ground supports consisting of the two bipod legs and the walking stick handle, and the first support is used for an alternate purpose of supporting and steadying a unit of auxiliary equipment such as a telescope, camera, or binoculars. In this mode, a standard "window clamp" is used to fasten the auxiliary equipment to the present invention by clamping the window clamp to one arm of the first support, and no additional human support is required to hold the equipment in position.

In a seventh operational mode, the bipod unit is extended, and the invention forms a tripod, with the three ground supports consisting of the two bipod legs and the walking stick handle, and the first support along with the second support are used to fully support a fishing rod or pole. In this mode of operation, the butt portion of the rod or pole is cradled between the two arms of the first support, while the central portion of the rod or pole is supported on the fork of the second support, and the tip of the rod or pole extends beyond the second support. In this mode, the rod or pole is completely supported by the invention, and no additional human support is required.

In an eighth and final operational mode, the present invention may be used as an aid for temporarily spreading the wires of a multi-wire fence (particularly, a barbed-wire fence), in order to allow a user to more easily pass between two adjacent wires, in order to cross through the fence without contacting the sharp barbs of the fence wires. In this mode of operation, the bipod unit may be either folded or removed from the main shaft. To employ the invention in this mode, the first support is pre-adjusted to a suitable position along the main shaft, and then the invention is positioned vertically alongside the fence wires so that the selected fence wire is lifted and temporarily supported in a raised position from underneath by the first support. By this means, the user may easily crawl between the raised wire and the adjacent lower wire without contacting the barbs of either wire. Following is a detailed description of the figures.

Figure 1:
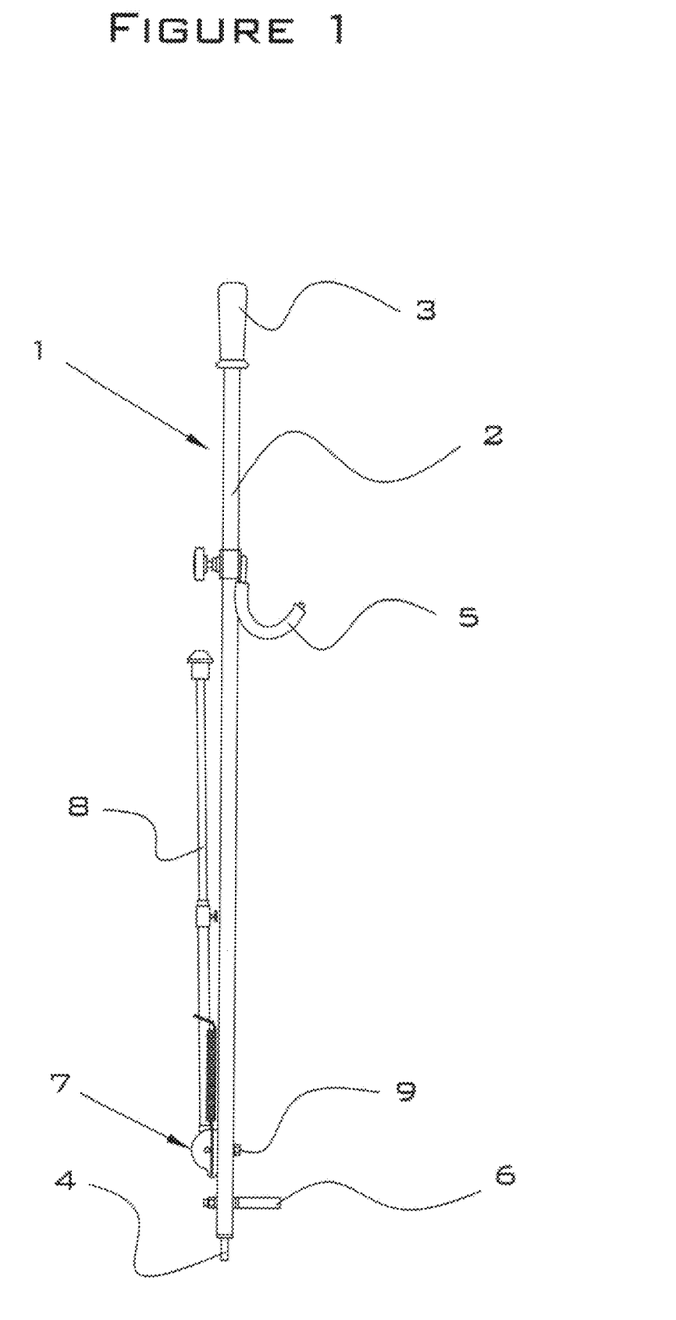
FIG. 1 is a side view of the present invention shown in a folded position.

FIG. 1 is a side view of the present invention, which is combination walking stick/shooting support 1. The primary components of the invention include the main shaft 2, the handle 3, the tip 4, the first support 5, the second support 6, the bipod unit 7 having two legs 8, and a bipod connector unit 9. The invention is shown in the upright (or vertical) position with the attached bipod unit 7 in the folded position, wherein the bipod legs 8 of the bipod unit 7 are approximately parallel to the main shaft 2. This position is employed when the present invention is used in the first operational mode, as described above.

The main shaft 2 is preferably constructed of aluminum tubing or channel suitable for partially supporting a person while walking; for example, square ¾-inch channel having an approximate length of 45 inches. The handle 3 is preferably comprised of synthetic rubber or polymer and is approximately cylindrical in shape and hollow, with an outside length of about 4½ inches and an outside diameter of about 1¼ inches. The hollow interior of the handle 3 is constructed with shape and dimensions so as to form a friction fit over the top end of the main shaft. The tip 4 is interchangeable and is attached to the bottom end of the main shaft 2 by a threaded rod (not shown). The tip 4 may be one of several commercial walking stick tips and is selected depending on the expected terrain; for example, a sharp pointed metal tip may be selected for use on ice, while a blunt rubber tip may be selected for use on soft ground.

Figure 2:
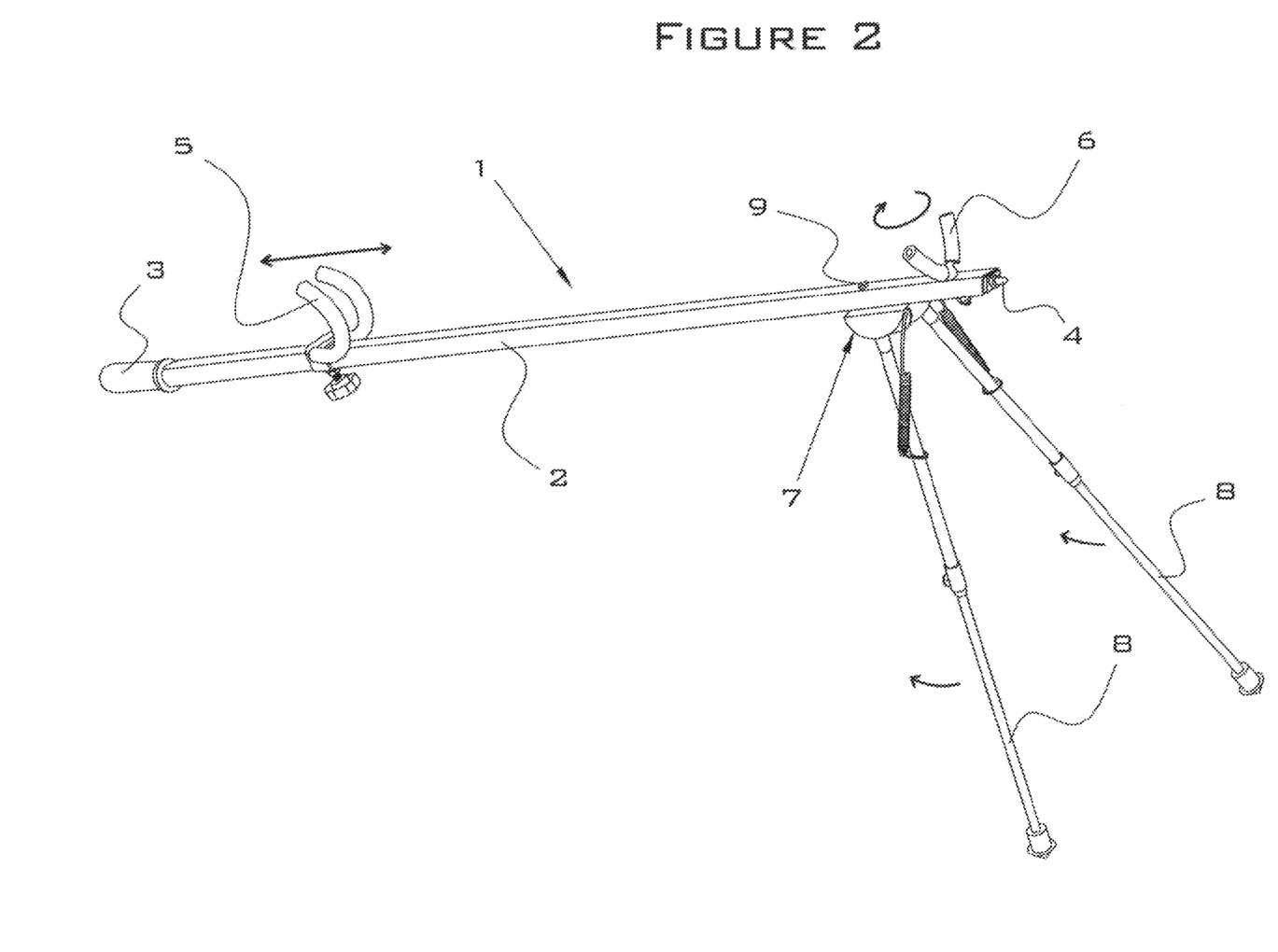
FIG. 2 is a perspective view of the present invention shown in an extended position.
Figure 3:
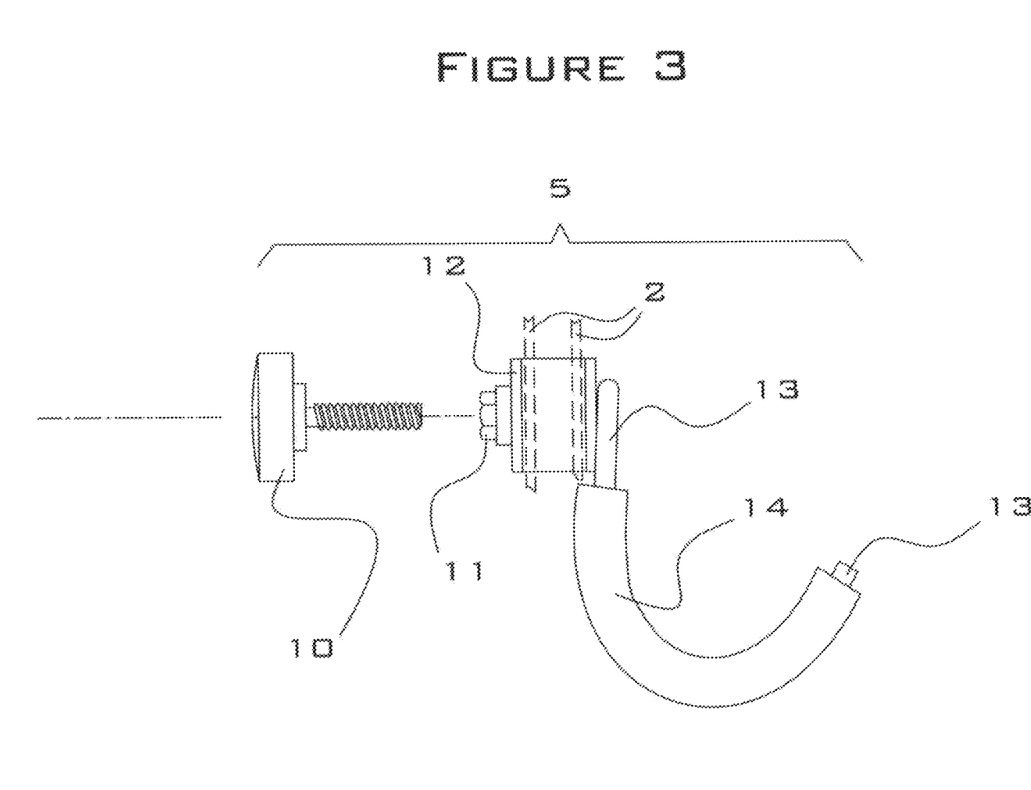
FIG. 3 is an exploded side view of the first support that illustrates the means by which this component is positioned on the main shaft.

The first support 5 fits around the main shaft 2 and is described in more detail in reference to following FIGS. 2 and 3. The first support 5 can be used in various modes, which are shown in FIGS. 6, 8, 9, 10, 11, 12, and 13. The second support 6 is bolted to the main shaft 2 and is described in more detail in reference to FIGS. 2 and 4. The second support 6 can be used in various modes, which are shown in FIGS. 7, 9, 10, and 12. The bipod unit 7 may be any suitable commercially available device that is equipped with a sling-stud attachment clamp. One example of a suitable bipod unit is Model 576-930 manufactured by Caldwell Shooting Supplies of Columbia, Mo. The bipod unit comprises two foldable legs 8 that are held in either the extended position or folded position by spring tension. The bipod unit is described in more detail in reference to FIG. 2. Various operational modes of the bipod unit 7 are shown in FIGS. 7, 8, 9, 10, 11, and 12. The bipod unit 7 is attached to the main shaft by means of the bipod connector unit 9. The connector unit is described in more detail in connection with FIG. 5.

FIG. 2 is a perspective view of the present invention, a combination walking stick/shooting support 1, which is shown with the bipod legs 8 in the extended position. This position is employed when the present invention is used in the second through eighth operational modes, as described above. The first support 5 may be moved (by sliding, as indicated by the arrows shown on the drawing) to any desired position along the length of the main shaft 2 between the handle 3 and the bipod unit 7 and may be locked to the main shaft 2 at any desired location between the handle 3 and the bipod unit 7. Additional information regarding the first support is provided in reference to FIG. 3.

The second support 6 is attached to the main shaft 2 at a location approximately 1½ inch from the tip 4. The second support 6 may be rotated in the direction shown by the circular arrow in the drawing. Additional information regarding the second support is provided in reference to FIG. 4. The direction of movement that occurs when the bipod legs are moved from the extended to the folded position is shown by the arrows on the drawing. The bipod unit 7 is attached to the main shaft 2 via the bipod connector unit 9. More details regarding the bipod connector unit 9 are provided in reference to FIG. 5.

In the prior art, bipod shooting devices are typically attached directly to the firearm, between the firearm forearm and the sling. When a bipod is attached directly to the firearm, it can cause discomfort to the shooter when the rifle is carried by the sling across the shoulder because the sharp edges of the bipod can dig into the shoulder of the shooter. In addition, the bipod can become entangled with backpack straps or clothing when the rifle is carried by the sling. The present invention overcomes these problems because the bipod is not directly attached to the firearm.

FIG. 3 is an exploded side view of the first support 5 that illustrates the means by which this component is positioned on the main shaft 2. As shown in the drawing, the first support 5 comprises a hand-tightenable bolt 10 that is threaded into a nut 11, which is welded to a rectangular metal sleeve 12. The internal dimensions of the sleeve 12 are set so that this sleeve 12 is able to slide over the main shaft 2. To set the position of the first support 5 at the desired point on the main shaft 2, the bolt 12 is sufficiently loosened so that the sleeve 12 slides freely over the main shaft 2. When the first support is positioned at the desired location, the hand-tightenible bolt 12 is tightened so that the end of bolt 12 presses against the main shaft 2, thereby binding the first support 5 to the main shaft 2. The first support also comprises twin curvilinear metal rods 13 that are welded to the sleeve 12. The metal rods 13 are preferably about ¼ inch in diameter and are covered with ½-inch outside diameter polymer tubing 14. The two tubing-covered rods form the twin "arms" of the first support 5. Although the curvilinear polymer-covered metal rod 13 shown in FIG. 3 is approximately semicircular in shape, a variety of curvilinear shapes would be suitable for this component. Examples of suitable shapes for the metal rods 13 include, but are not limited to, U-shaped, C-shaped, semi-elliptic, hyperbolic, and parabolic. The spacing between the two rods 13 is described in reference to FIG. 8.

Figure 4:
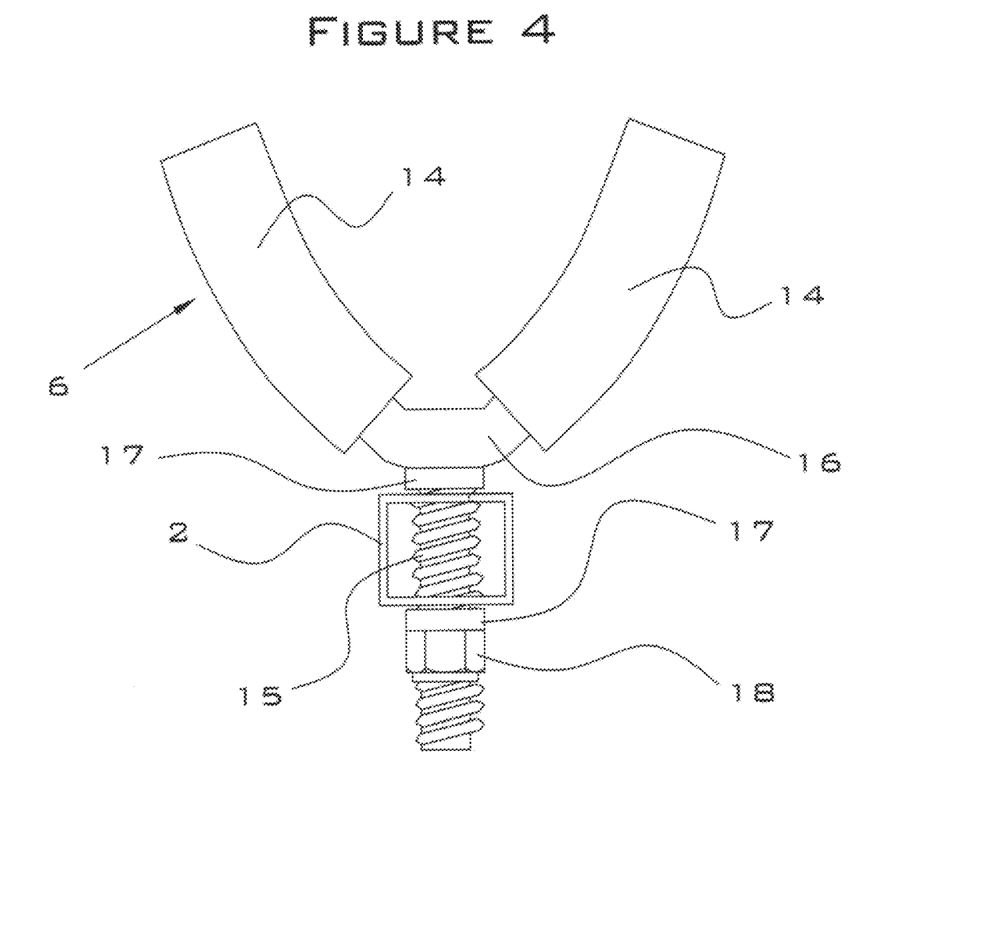
FIG. 4 is a front view of the second support that illustrates the means by which this component is positioned on the main shaft in a rotatable manner.

FIG. 4 is a front view of the second support 6 that illustrates the means by which this component is positioned on the main shaft 2 in a rotatable manner. The second support 6 comprises a threaded rod 15 that is welded to metal fork 16 having a preferred diameter of ¼-inch. The two prongs of the fork 16 are covered with polymer tubing 14 having a preferred outside diameter of ½-inch. The threaded rod 15 passes through holes (not shown) in the top and bottom sides of main shaft 2. Nylon washers 17 are positioned on the threaded rod 15 above and below the outside of the main shaft 2 as shown. The nylon-filled locknut 18 is used to secure the threaded rod 15 to the main shaft 2. The nylon-filled locknut 18 is set sufficiently loose on the threaded rod 15 so that the threaded rod 15 may be rotated by hand-turning the tubing-covered fork 16. The purpose of the nylon washers 17 is to maintain a moderate level of rotational friction, thereby allowing the fork/16 to rotate easily by hand but to remain in position after being manually rotated. Although the fork 16 is shown in FIG. 4 as Y-shaped, a variety of shapes are suitable for this component.

Examples of suitable shapes for the fork 16 include, but are not limited to, U-shaped and semi-circular.

Figure 5:
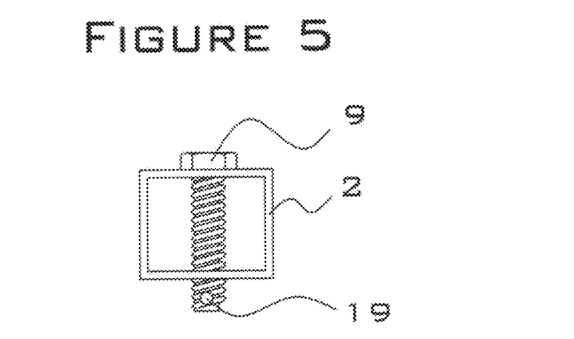
FIG. 5 is a side view of the bipod connector unit.

FIG. 5 is a side view of the bipod connector unit 9, which is comprised of a 5/16-inch diameter steel bolt that is drilled with a 9/64-inch diameter bipod-connection hole 19. The connector unit 9 is attached to the main shaft 2 by threaded holes (not shown) that are tapped into the top and bottom sides of the main shaft 2. The diameter of the bipod-connection hole 19 is selected to be compatible with the latching pin diameter of standard commercially available bipods.

Figure 6:
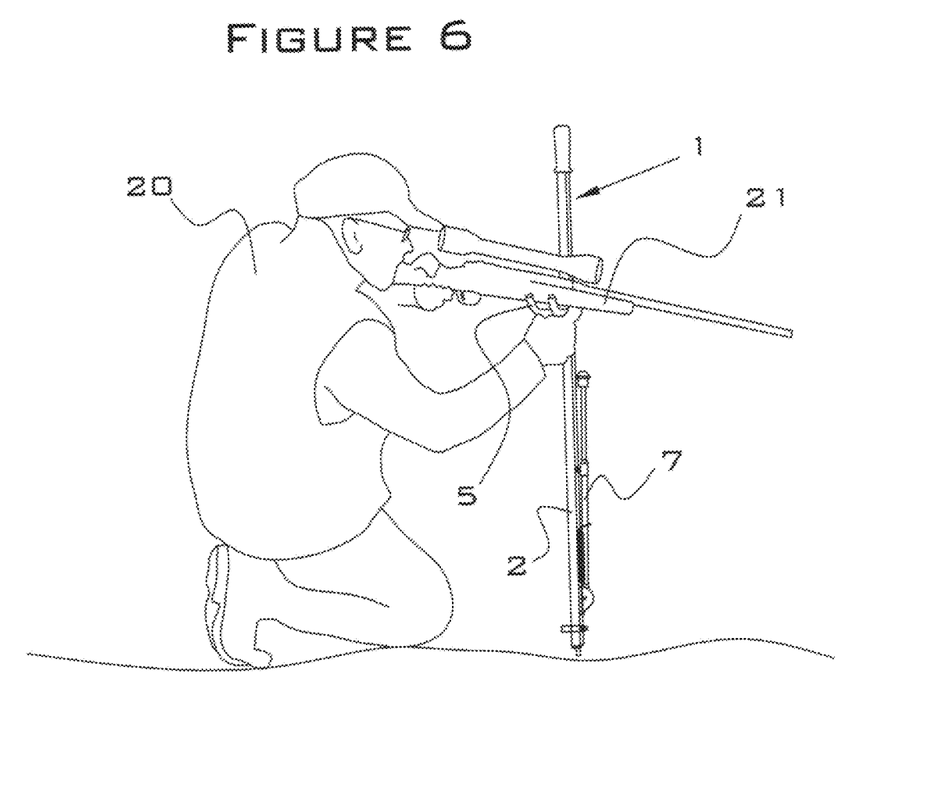
FIG. 6 illustrates the present invention being used in the first operational mode, in order to provide steadying support for a rifle being aimed by a shooter who has assumed a kneeling position.

FIG. 6 illustrates the present invention being used in the first operational mode, in order to provide steadying support for a rifle being aimed by a shooter who has assumed a kneeling position. As shown in the drawing, the combination walking stick/shooting support 1 is held upright by the right hand of the shooter 20, while the rifle 21 is supported from underneath by first support 5. When the present invention is used in this mode of operation, the bipod unit 7 is preferably folded against the main shaft 2 as shown. Alternately, the bipod unit 7 may be disconnected from the main shaft, since it is not required to steady the rifle 21 in this mode of operation.

Figure 7:
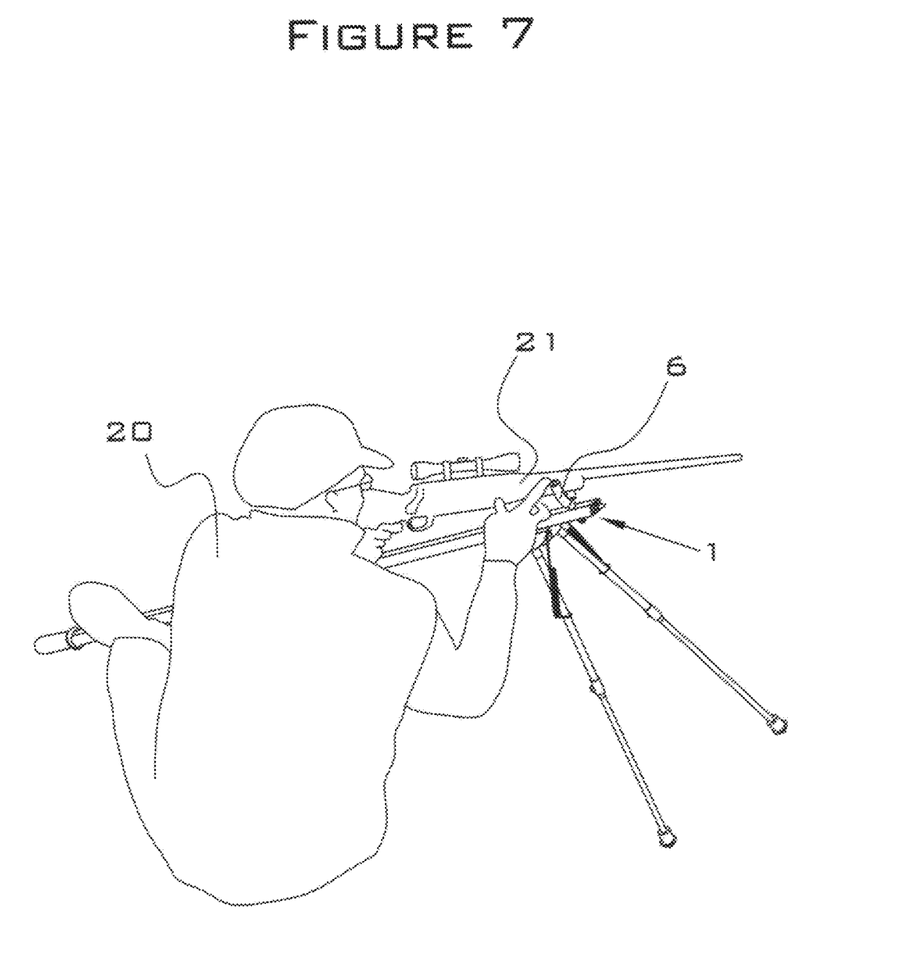
FIG. 7 illustrates the present invention being used in the second operational mode, in order to provide steadying support for a rifle being aimed by a shooter who has assumed a sitting position.

FIG. 7 illustrates the present invention being used in the second operating mode, in order to provide steadying support for a rifle being aimed by a shooter who has assumed a sitting position. As shown, the rifle 21 is supported in the fork of the second support 6. As described previously, the second support 6 is rotatable, which enables the shooter 20 to swing the rifle 21 laterally for precise aiming.

Figure 8:
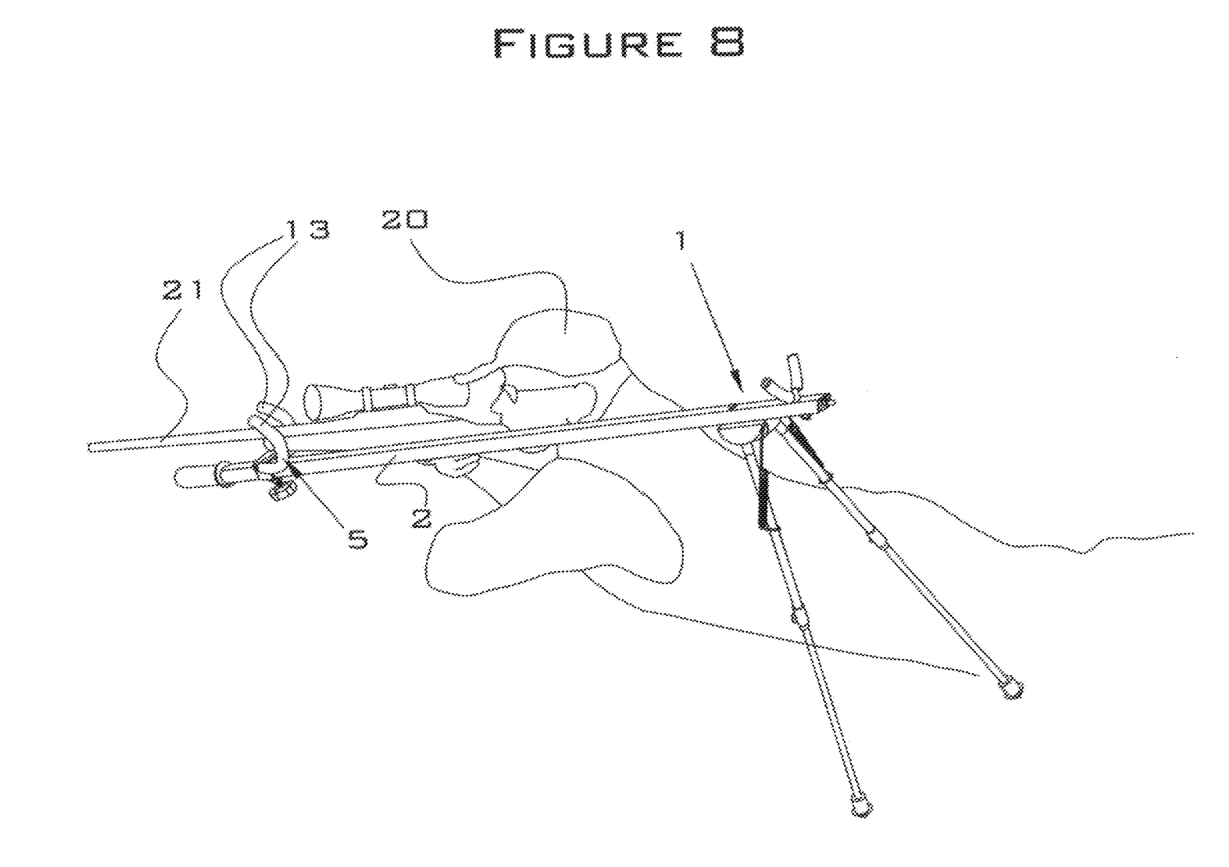
FIG. 8 illustrates the present invention being used in the third operational mode, in order to provide steadying support for a rifle being aimed by a shooter who has assumed a prone position.

FIG. 8 illustrates the present invention being used in the third operating mode, in order to provide steadying support for a rifle being aimed by a shooter who has assumed a prone position. As shown, the rifle 21 is supported between the two polymer-covered rods 13 (also referred to as "arms") of the first support 5. The spacing between the arms preferably increases as the rods 13 get further from the main shaft in order to provide a firm grip for a variety of widths of objects. For example, the inside width (i.e., width closest to the main shaft) between the arms may be approximately 1½ inch near the main shaft 2, linearly increasing to approximately two inches at the terminal ends of the arms. By this means, for example, a rifle having a forearm width of 1¾ inch would be supported between the two arms approximately at their midpoint, while a rifle having a forearm width of 1⅝ inch would be supported between the arms closer to the main shaft 2.

Figure 9:
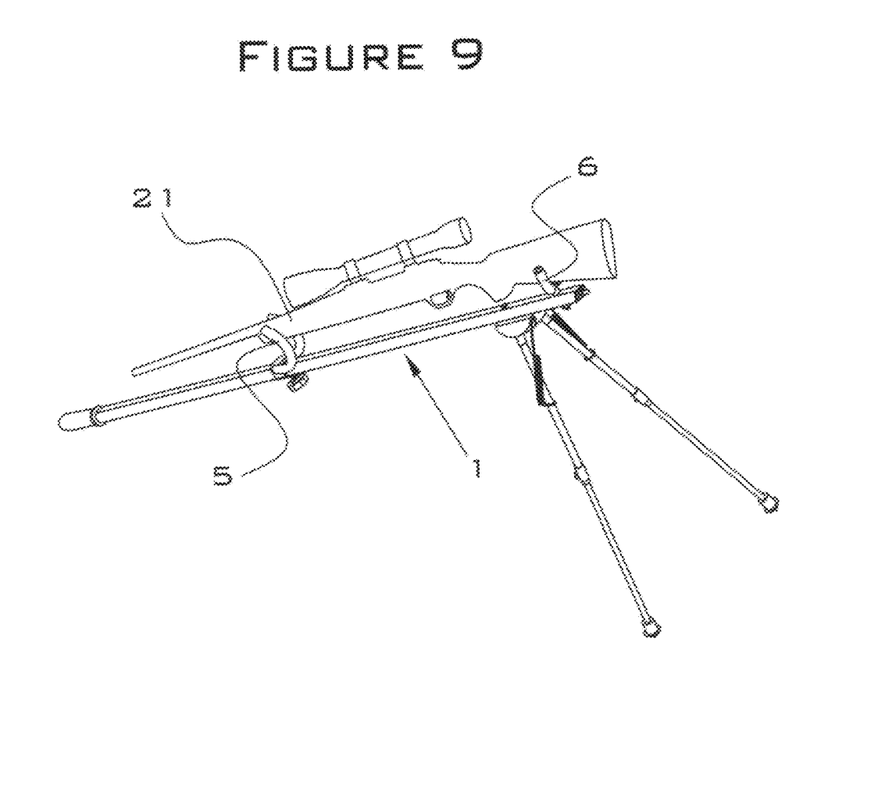
FIG. 9 illustrates the present invention being used in the fourth operational mode, in order to provide full support for a rifle whose barrel is pointed in a downward direction.

FIG. 9 illustrates the present invention being used in the fourth operating mode, in order to provide full support for a rifle 21 whose barrel is pointed in a downward direction. As shown, in this operating mode, the forearm portion of the rifle 21 is gripped between the two arms of the first support 5, while the butt portion of the rifle 21 is supported between the two forks of the second support 6.

Figure 10:
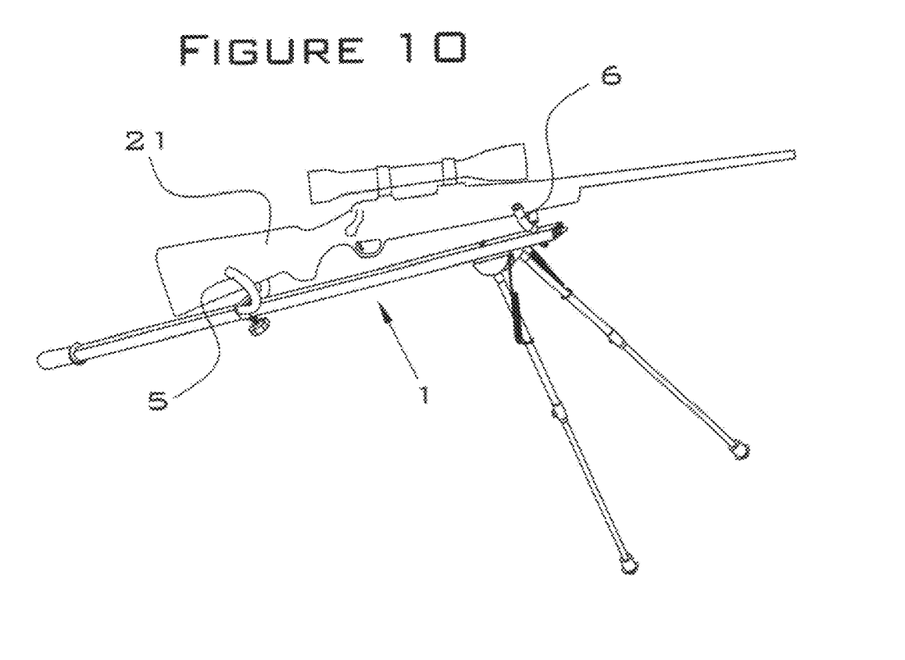
FIG. 10 illustrates the present invention being used in the fifth operational mode, in order to provide full support for a rifle with an upward-pointed barrel.

FIG. 10 illustrates the present invention being used in the fifth operating mode, in order to provide full support for a rifle with an upward-pointed barrel. As shown, in this operating mode, the butt portion of the rifle 21 is gripped between the two arms of the first support 5, while the forearm portion of the rifle 21 is supported in the fork of the second support 6.

Figure 11:
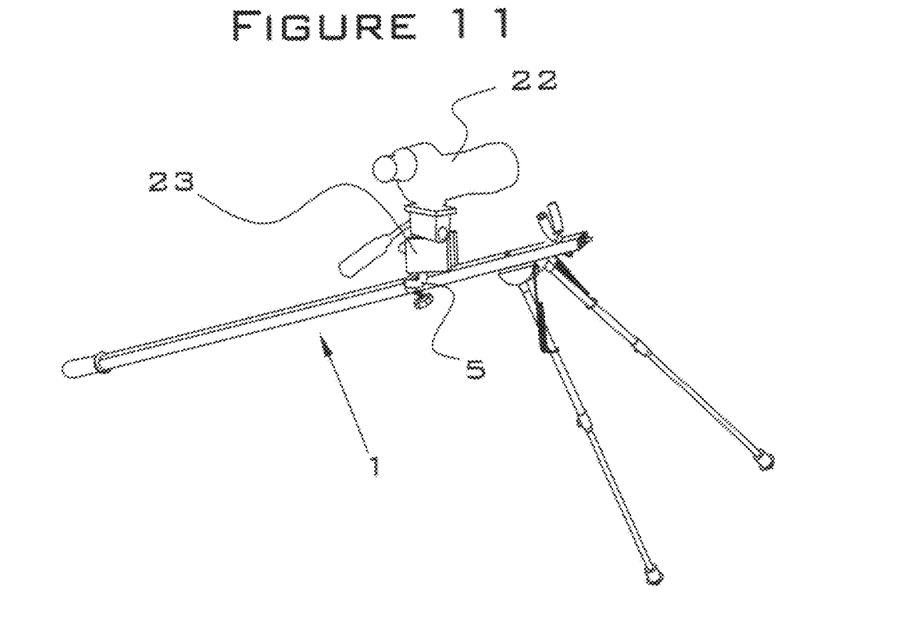
FIG. 11 illustrates the present invention being used in the sixth operational mode, in order to fully support a piece of auxiliary equipment such as binoculars, a camera, or a spotting telescope.

FIG. 11 illustrates the present invention being used in the sixth operating mode, in order to fully support a piece of auxiliary equipment such as binoculars, a camera, or a spotting telescope. As shown, a spotting telescope 22 is attached to a commercially available window clamp 23, and the window clamp is clamped to one arm of the first support 5 that has been positioned near the upper end of the main shaft 2 of the present invention. One example of a commercially available window clamp is the Cabela's Car Window Mount, Item #IK-710123, available from Cabela's Outfitters of Sidney, Nebr.

Figure 12:
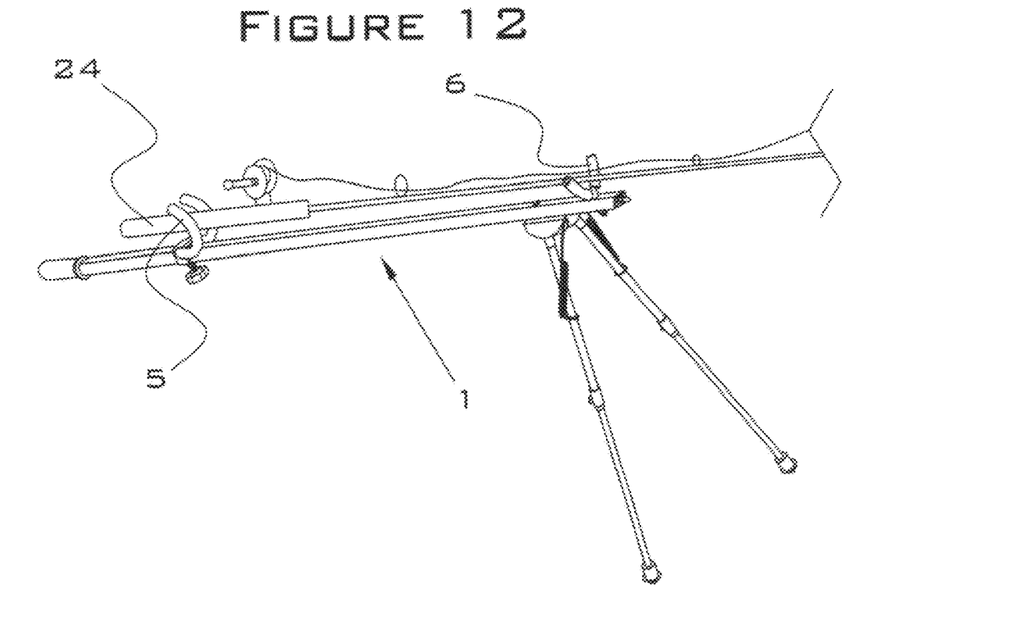
FIG. 12 illustrates the present invention being used in the seventh operational mode, in order to support a fishing rod or pole.

FIG. 12 illustrates the present invention being used in the seventh operating mode, in order to support a fishing rod or pole. As shown in this drawing, a fishing rod 24 may be gripped between two arms of the first clamp 5 and supported on the fork of the second support 6.

Figure 13:
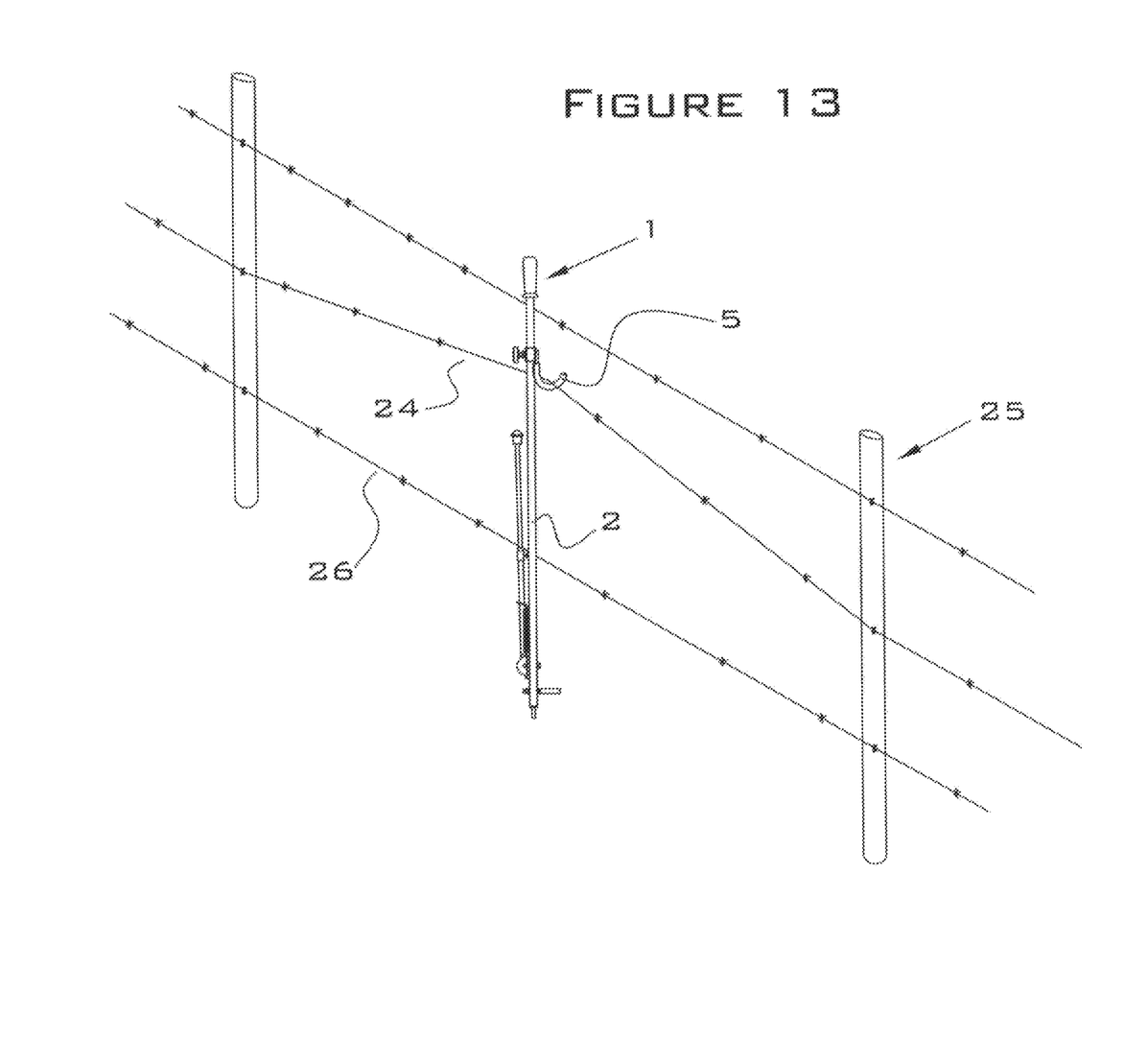
FIG. 13 illustrates the present invention being used in the eighth operational mode, in order to temporarily hold a fence wire in a raised position.

FIG. 13 illustrates the present invention being used in the eighth operating mode, in which the combination walking stick/shooting support 1 is used to temporarily hold a fence wire 24 in a raised position so that a person may more easily cross the fence 25 by crawling between the fence wire 24 and the adjacent lower fence wire 26. As shown in the drawing, the first support 5 is adjusted to a suitable position on the main shaft 2 and then placed underneath the fence wire 24 that is desired to be raised. The combination walking stick/shooting support 1 is then set at a vertical orientation so that the supported wire is raised above its normal height.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A firearm support structure comprising:
   (a) a main shaft with a bottom end;
   (b) a bipod connector unit;
   (c) a slidable first support that is movable along the main shaft between a handle and the bipod connector unit; and
   (d) a rotatable second support that is situated between the slidable first support and the bottom end of the main shaft;
   wherein the slidable first support comprises two curvilinear metal rods, wherein the two curvilinear metal rods are attached to a sleeve that surrounds the main shaft, wherein each of the two curvilinear metal rods has a terminal end, wherein there is a spacing between the two curvilinear metal rods, and wherein the spacing between the two curvilinear metal rods increases from the point at which the metal rods attach to the sleeve to the terminal ends of the metal rods.

2. A firearm support structure comprising:
   (a) a main shaft with a bottom end;
   (b) a bipod connector unit;
   (c) a slidable first support that is movable along the main shaft between a handle and the bipod connector unit; and
   (d) a rotatable second support that is situated between the slidable first support and the bottom end of the main shaft;
   wherein the rotatable second support comprises a metal fork.

3. The firearm support of claim 2, wherein the metal fork is covered with polymer tubing.

* * * * *